(12) United States Patent
Paquin et al.

(10) Patent No.: US 10,875,187 B2
(45) Date of Patent: Dec. 29, 2020

(54) ROBOTIC ARM CAMERA SYSTEM AND METHOD

(71) Applicant: ROBOTIQ INC., Saint-Nicolas (CA)

(72) Inventors: Vincent Paquin, L'Ancienne-Lorette (CA); Marc-Antoine Lacasse, Quebec (CA); Yan Drolet-Mihelic, Quebec (CA); Jean-Philippe Mercier, Lévis (CA)

(73) Assignee: ROBOTIQ INC., St-Nicolas (CA)

( * ) Notice: Subject to any disclaimer, the term of this patent is extended or adjusted under 35 U.S.C. 154(b) by 325 days.

(21) Appl. No.: 15/986,293

(22) Filed: May 22, 2018

(65) Prior Publication Data

US 2018/0361589 A1 Dec. 20, 2018

Related U.S. Application Data

(60) Provisional application No. 62/521,046, filed on Jun. 16, 2017.

(30) Foreign Application Priority Data

Jun. 16, 2017 (CA) ...................................... 2977077

(51) Int. Cl.
*B25J 9/00* (2006.01)
*B25J 9/16* (2006.01)
(Continued)

(52) U.S. Cl.
CPC ........... *B25J 9/1697* (2013.01); *B25J 9/0081* (2013.01); *B25J 9/1692* (2013.01); *B25J 15/022* (2013.01); *B25J 19/023* (2013.01); *G05B 2219/39045* (2013.01); *Y10S 901/03* (2013.01); *Y10S 901/47* (2013.01)

(58) Field of Classification Search
CPC ...... B25J 9/1697; B25J 15/022; B25J 19/023; B25J 9/0081; B25J 9/1692; G05B 2219/39045; Y10S 901/03; Y10S 901/47
See application file for complete search history.

(56) References Cited

U.S. PATENT DOCUMENTS 8,306,314 B2 * 11/2012 Tuzel ...................... G06T 7/586
382/153
8,406,923 B2 3/2013 Ueyama et al.
(Continued)

OTHER PUBLICATIONS

CA2977077 2nd Office Action dated Jun. 1, 2018 with related claims.
(Continued)

*Primary Examiner* — Ian Jen
(74) *Attorney, Agent, or Firm* — Anglehart et al.

(57) ABSTRACT

A robotic arm mounted camera system allows an end-user to begin using the camera for object recognition without involving a robotics specialist. Automated object model calibration is performed under conditions of variable robotic arm pose dependent feature recognition of an object. The user can then teach the system to perform tasks on the object using the calibrated model. The camera's body can have parallel top and bottom sides and adapted to be fastened to a robotic arm end and to an end effector with its image sensor and optics extending sideways in the body, and it can include an illumination source for lighting a field of view.

17 Claims, 13 Drawing Sheets

(51) Int. Cl.
*B25J 15/02* (2006.01)
*B25J 19/02* (2006.01)

(56) References Cited

U.S. PATENT DOCUMENTS

2016/0114486 A1  4/2016  Huang et al.
2016/0214255 A1  7/2016  Uhlenbrock et al.

OTHER PUBLICATIONS

CA2977077 first Office Action dated Jan. 24, 2018 with related claims.
CA2977077 3rd Office Action dated Oct. 15, 2018 with related claims.

* cited by examiner

ROBOTIC ARM CAMERA SYSTEM AND METHOD

This application is a nonprovisional U.S. patent application, which claims priority of Patent Application in U.S. No. 62/521,046 filed Jun. 16, 2017 and Patent Application in Canada No. 2,977,077 filed Jun. 16, 2017, the contents of which are hereby incorporated by reference.

TECHNICAL FIELD

This application relates to a robotic arm system that includes an arm-mounted camera, and to related methods, such as methods for teaching and/or configuring the robot system. By extension, the present application also relates to manufacturing products using such robotic arm systems.

BACKGROUND

Robotic arms are used in automation of manufacturing, for example in the automotive industry. While such robots are commonly used without machine vision systems in which objects to be manipulated or processed are held with the requisite degree of precision by jigs and other forms, camera systems are also known and used. Camera systems fall into two types, ones where the camera system is fixed so as to observe key portions of the working space and ones where the camera system is mounted to a robotic arm. The former type is common, and the latter type is used in a small percentage of applications.

For cameras providing machine vision, lighting is an important parameter since lighting variations can result in machine vision errors. Therefore, robotic system cameras use lighting systems that are carefully designed to prevent lighting variations and/or the robotic system is only installed in areas not prone to lighting variation.

When robots are programmed or trained to perform a function, a robotics specialist is required to use a programming interface to establish the sequence of movements and operations to be performed. In the case of machine vision guidance, additional intervention by the robotics specialist is required.

Robotic systems are more frequently being applied in environments in which the robotic system operates in a work area shared with a human operator in order to assist human operators in performing tasks. In these systems, the robotic arms are typically smaller and the work area involves lighting suitable for or acceptable to the human operator.

SUMMARY

Applicant has discovered that a robotic arm camera can be integrated into a robotic arm conveniently by integrating the camera at an end effector wrist module. This module can also provide an interface for a data connection, preferably a wired data connection, that serves the end effector, preferably in addition to serving the camera. Such a robotic arm camera can also take the shape of the robotic arm end, such as a disk at the end of a circular cross-section robotic arm end, with camera optics being located in one or more protruding tabs or ears from the body of the camera, without interfering with the movement of the robotic arm within the working area. The camera optics can be single for a single camera or multiple for a plurality of camera views, and the camera optics can be arranged to be directed to view in the direction of the end effector and/or at an angle away from the direction of the end effector.

Applicant has discovered that a robotic arm camera can integrate its own light source and include lighting variation intensity compensation so as to provide image correction that is dependent on robotic arm pose (pose means position and orientation). Such compensation can be quite important since the image quality is highly dependent on the camera pose. Furthermore, the quality of light sources that can be integrated into a robotic arm mounted camera can be limited due to size constraints, and poor illumination can lead to errors in machine vision.

Applicant has discovered that a robotic arm task teaching system can be provided that allows an end-user to successfully teach a robotic arm-mounted camera vision system to learn to recognize an object within a workspace under the conditions of illumination that involves ambient lighting and optionally a light source that is also mounted to the robotic arm. With objects able to be recognized by the vision system under such conditions, the robotic arm system can be used, in some embodiments, to assist an operator in performing tasks with assisted automation.

A robotic arm mounted camera system allows an end-user to begin using the camera for object recognition without involving a robotics specialist. Automated object model calibration is performed under conditions of variable robotic arm pose dependent feature recognition of an object. The user can then teach the system to perform tasks on the object using the calibrated model. The camera's body can have parallel top and bottom sides and adapted to be fastened to a robotic arm end and to an end effector with its image sensor and optics extending sideways in the body, and it can include an illumination source for lighting a field of view.

BRIEF DESCRIPTION OF THE DRAWINGS

The invention will be better understood by way of the following detailed description of embodiments of the invention with reference to the appended drawings, in which.

DETAILED DESCRIPTION

Figure 1:
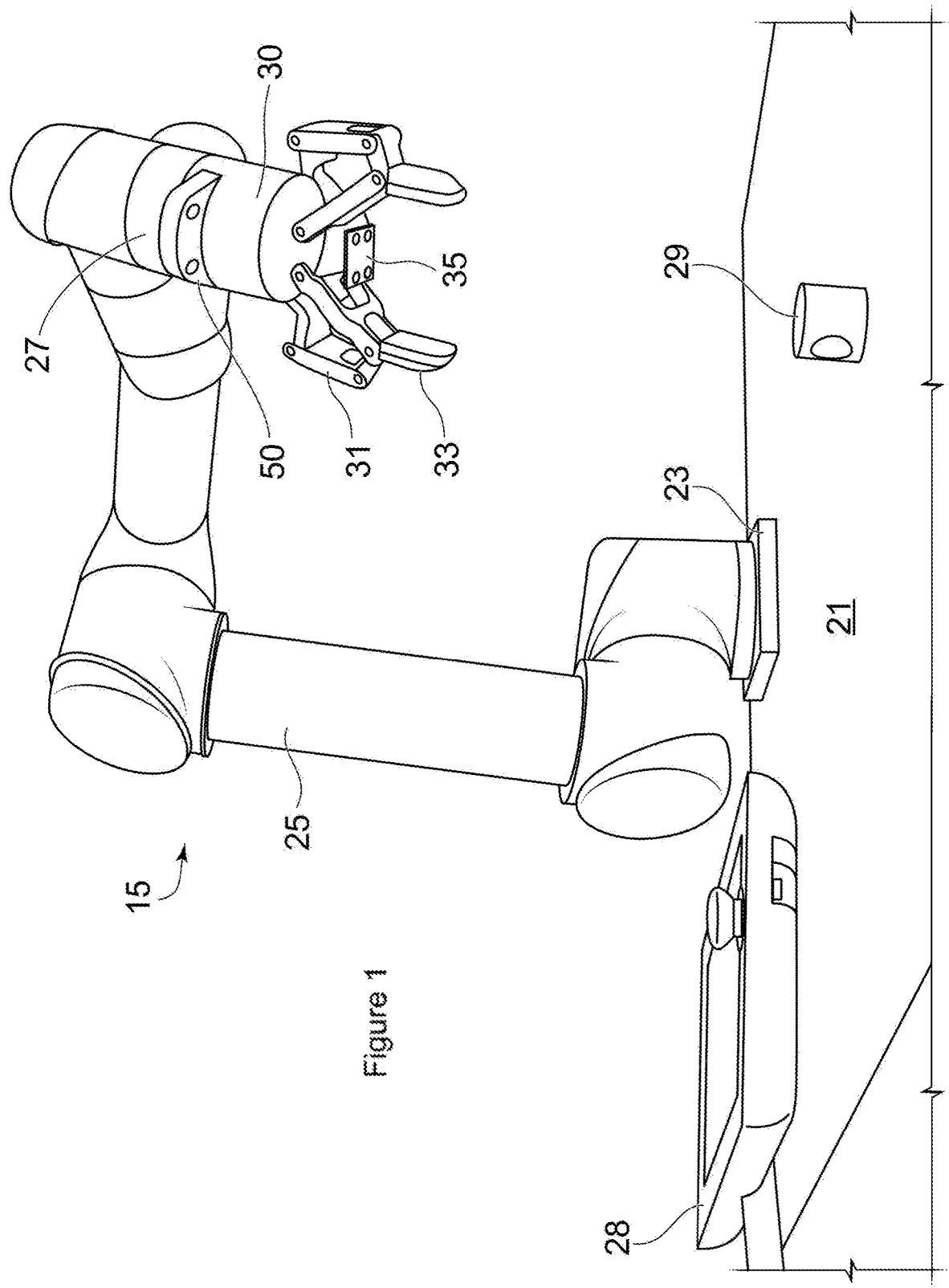
FIG. 1 is a frontal view of a small robotic arm mounted on a table providing a working area, with an arm-mounted camera able to acquire images of the working area.

FIG. 1 shows a robotic system 15 having a base 23 mounted to a table providing a working area 21. The system 15 has a number of joints and segments 25 terminating in an end 27 to which the end-effector can be attached. The robotic system can be taught using a suitable user interface, for example a pendant interface 28, so that the robot can perform operations on any suitable objects, such as object 29, within the working area 21. The first component attached to the system 15 is the camera 50. Optionally, a force-torque sensor (not shown) may be attached between the end effector 30 and the robot end 27. Such a sensor may be of a variety of designs, for example, it may be according to US patent application publication 2015/0323398. The end-effector in this embodiment comprises a gripper 30. Any suitable tool or probe device may be the end-effector. The gripper can be of any desirable configuration, and in the embodiment illustrated it is a two-finger gripper having proximal phalanges 31 and distal phalanges 33 with a palm 35. The configuration illustrated is described in U.S. Pat. No. 8,973,958, and can perform both pinch and encompassing grasps of objects.

As described above, robotic systems are typically configured to operate by involving a robotic specialist. In many cases, it is desirable to allow the end-user of the robot to be able to configure the robot to perform a task. As will be described below, a user interface can be provided within the pendant interface 28, or any other suitable interface, to allow a user to complete an installation and configuration of the robotic system 15 including camera 50. Robot installation can cover all aspects of how the robot is placed in its working environment. It can include the mechanical mounting of the robot, electrical connections to other equipment, as well as all options on which the robot program depends.

Figure 2:
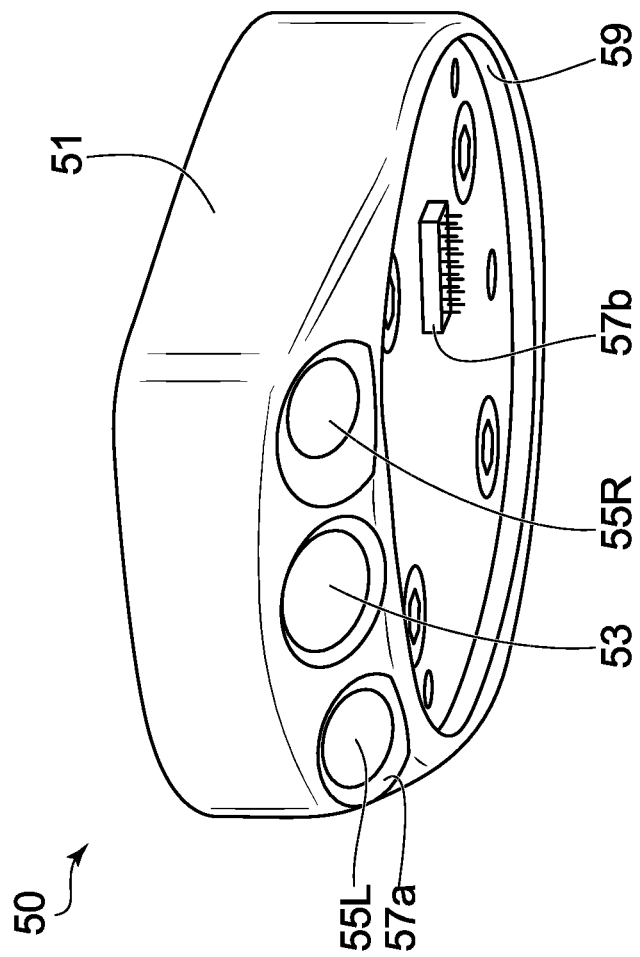
FIG. 2 is an oblique view of a robotic arm "wrist" camera to be connected between an end-effector and a distal end of a robotic arm and having a central optics window and two light sources arranged one on each side of the camera optics window, in which the camera is integrated into a connector plate for providing data connectivity to an end-effector.
Figure 3:
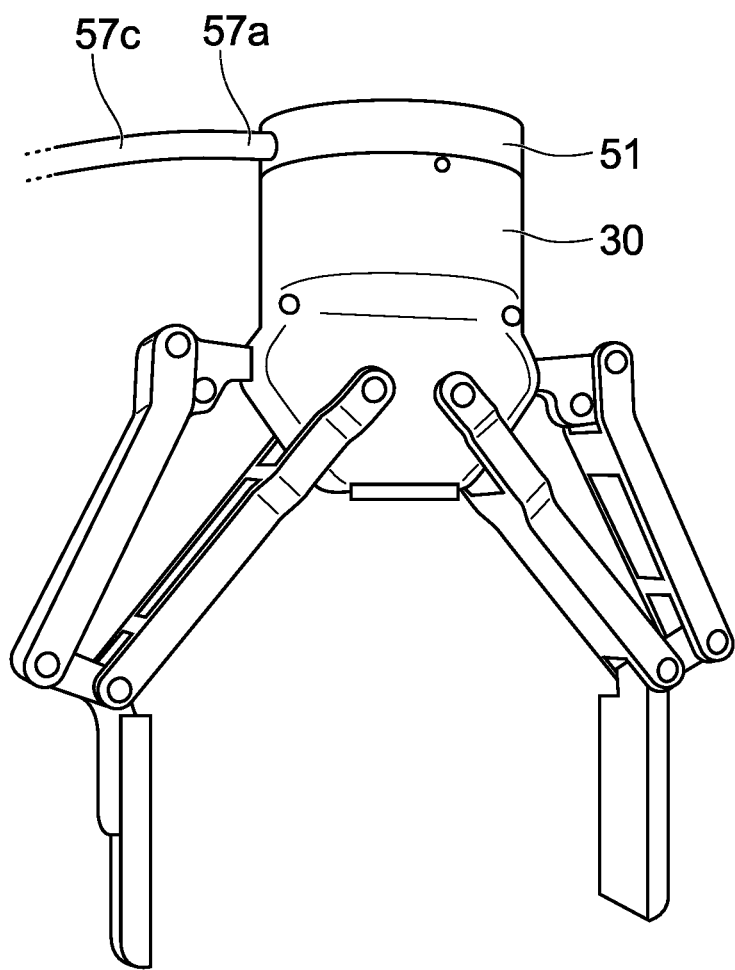
FIG. 3 is a front view of a robotic gripper end-effector connected to the wrist camera of FIG. 2 in which the data cable connection not shown in FIG. 2 is shown while the ear having the optics and light sources is not seen.

As illustrated in FIGS. 2 and 3, the camera 50 can be integrated in a connector plate connected to end 27 of the robotic arm system 15. A suitable camera 50 can also be connected using a bracket attached to any suitable part of the arm 15. In the embodiment shown in FIG. 2, the camera 50 has a disk-shaped body 51 with an ear or protrusion on one side accommodating camera optics 53 with a pair of lighting sources 55L and 55R arranged to each side of the camera optics 53. A data connector port 57a can be provided on the hidden side in FIG. 2 that can receive a power/data cable 57c (shown in FIG. 3) and a data connector 57b can provide data and power to the end effector 30 and/or the sensor 40. In the embodiment of FIG. 2, a circular rim 59 is designed to mate with the end effector 30. Mounting of the camera 50 and the end-effector 30 to the arm end 27 is done using suitable fasteners as is known in the art.

While the mounting of the camera 50 to the arm end 27 can be arranged to be in a single known pose, this would require that the camera and the arm end 27 be originally designed uniquely for each other with specific tolerances. When this is not the case, the robotic system 15 needs to learn the camera pose with respect to the robotic arm 15.

Figure 4A:
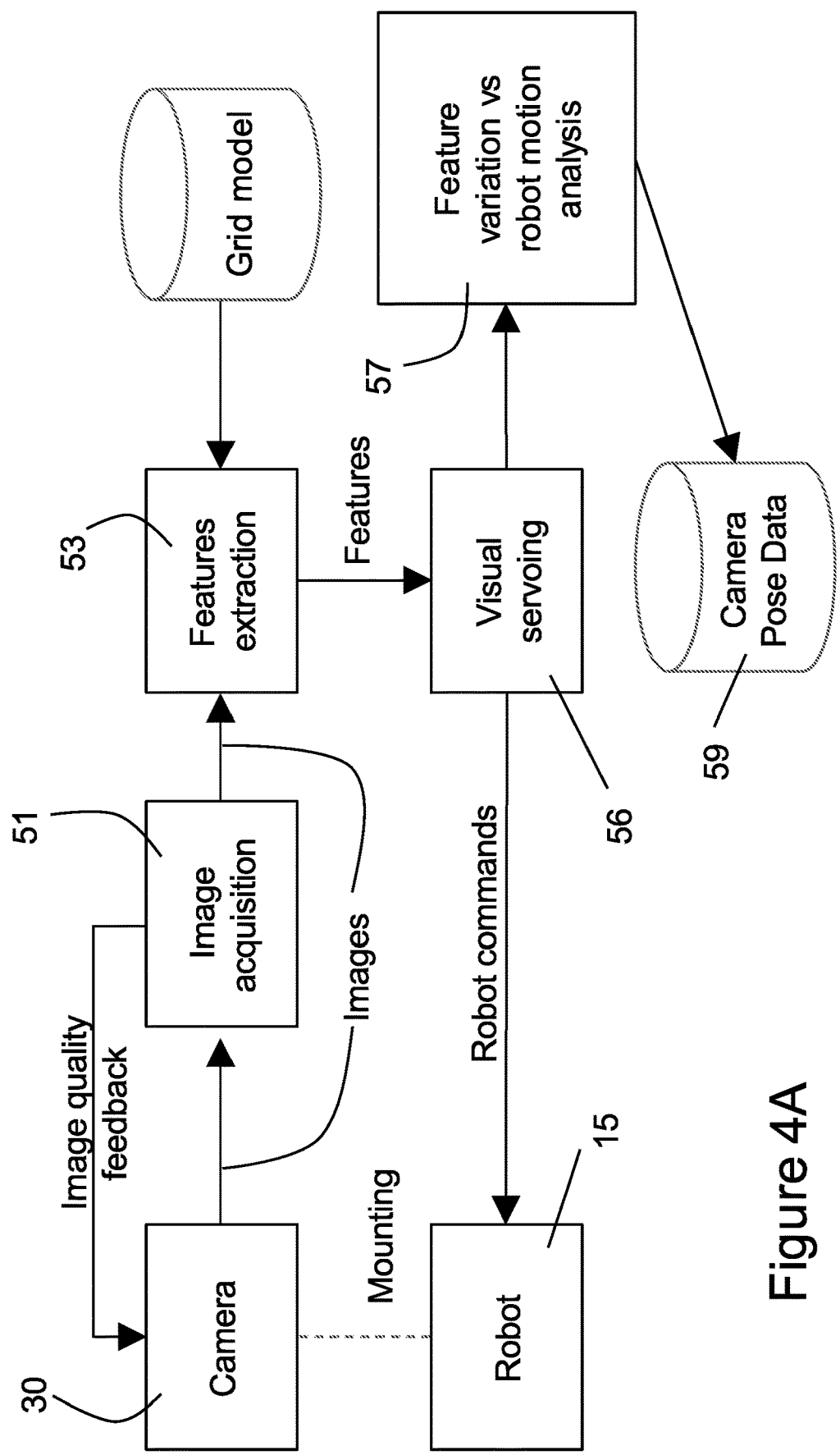
FIG. 4A is a schematic block diagram of a calibration system for the camera mounted to the robotic arm.

This learning or configuration can be performed by a robotics specialist who would make the determination and configure the pose information within the programming of the robot, however, it can be desirable to allow the end-user to perform such configuration. As illustrated in FIG. 4A, the end user can place a predetermined object, preferably an object having easily recognizable features, such as a grid within the working area 21 so that robotic system 15 can be configured to acquire images using camera 50. To start, the end user can manipulate the robot 15 so that the camera is facing generally in the direction of the predetermined object, and then press a start button on the user interface 28. As illustrated in FIG. 4A, the robotic system 15 will signal the camera 50 to acquire an image, extract from the image the features of the predetermined calibration object (in this case a grid), while the visual servoing module 56 begins a process of changing the camera's position using the robot's motion system to assume a number of different camera poses while acquiring images using module 51.

Although the camera is mounted to the end 27 of the robot 15 in an unknown pose, module 57 is able to determine the camera pose relative to the end 27 by analyzing the difference in observed features in the images by feature extraction module 53 versus expected features from the model. The variations in these differences, as the pose of the end 27 is varied, is used to calculate that camera pose relative to the end 27. Preferably, these variations involve different distances from the working area 21 as well as different orientations. Module 56 performs the visual servoing, and the resulting camera pose calibration data is stored in memory 59. In this way, the camera 30 that the user attached to the robot system 15 is automatically calibrated with the end user's assistance to place the known object (e.g. grid) in the working area 21 and to start the automated calibration process. Alternatively, the user could be prompted via interface 28 to manually vary the pose of the end 27 instead of commanding the robot 15 to do so. The calibration data stored in 59 will subsequently be used to relate the position of objects recognized in images from camera 30.

Figures 4B, 4C, 4D:
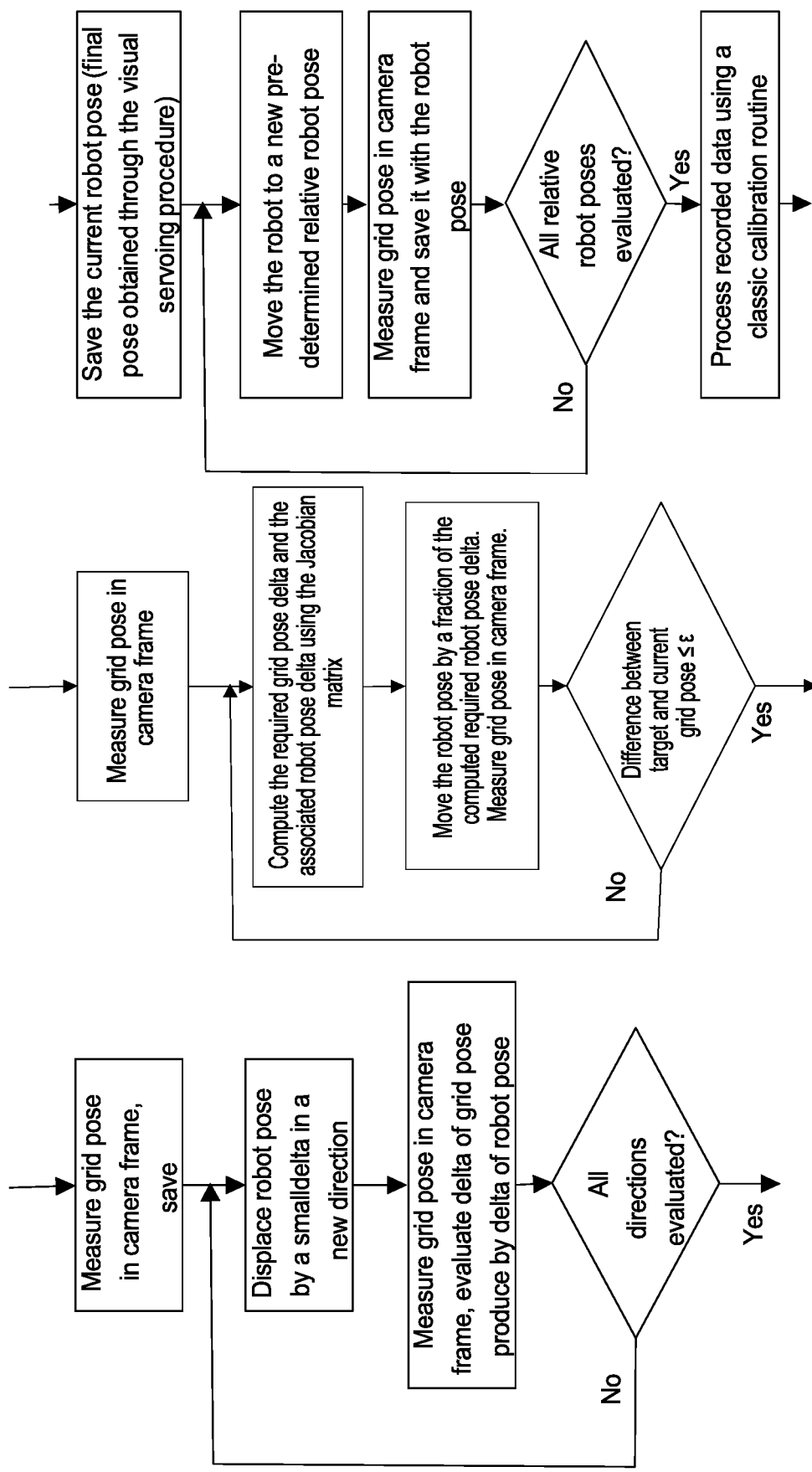
FIG. 4B is a flow diagram of measuring the visual servoing Jacobian matrix.
FIG. 4C is a flow diagram of visual servoing to a preset grid position in camera frame.
FIG. 4D is a flow diagram of robot motion for calibration data gathering.

The process of determining the camera pose will be described with reference to flow charts of FIGS. 4B to 4D. As shown in FIG. 4B, the known object (e.g. the grid) is located within the camera image. Then the robot is controlled to make a small movement, also called a delta, by a predetermined amount in each of the six directions (x, y, z translations and x, y and z rotations). The movements are large enough to be able to detect a change in the pixel image of the known calibration object, without losing the object within the camera field of view. Then the grid pose is measured in the camera frame, so as to evaluate the delta in the grid pose produced by the delta in the robot pose. The grid pose and the delta are recorded, and from this data, the camera pose transformation matrix is calculated.

FIG. 4C illustrates the flow involved in using the transformation matrix to position the robot to a predetermined pose relative to the grid. In this process, the matrix transformation and the current grid layout in the camera's frame are used to calculate the necessary theoretical robot shift that would allow the grid to be positioned at the reference position. The robot is then moved only by a small fraction of the displacement estimated in the previous step. Indeed, the estimation is made using data calculated for a pose and it is therefore necessary to avoid making too great a displacement. The pose of the grid in the reference frame of the camera with the target pose is compared and the procedure is continued as long as the grid is not close enough to the reference position.

FIG. 4D illustrates the flow involved in confirming the transformation matrix. The current pose is recorded since the other poses will be calculated from this one. As the visual servoing algorithm of FIG. 4C converged at this pose, it is assumed that one is at a known position above the grid. The robot is moved to a pose (relative to the reference one) which allows the grid to be observed with a different point of view (with translation and rotation) of the other poses. This pose is pre-determined and ensures that the grid is fully visible in the field of view of the camera. The grid is positioned in the camera's frame and recorded with the robot. These two pieces of information will enable the final step to calibrate the relationship between the camera reference and the work plane. With a set of robot poses registered to a set of grid pose in the camera frame, it is possible using standard algorithms to evaluate the geometric parameters that are required to compute the object position in the robot frame when it is seen in the camera frame.

Figure 5:
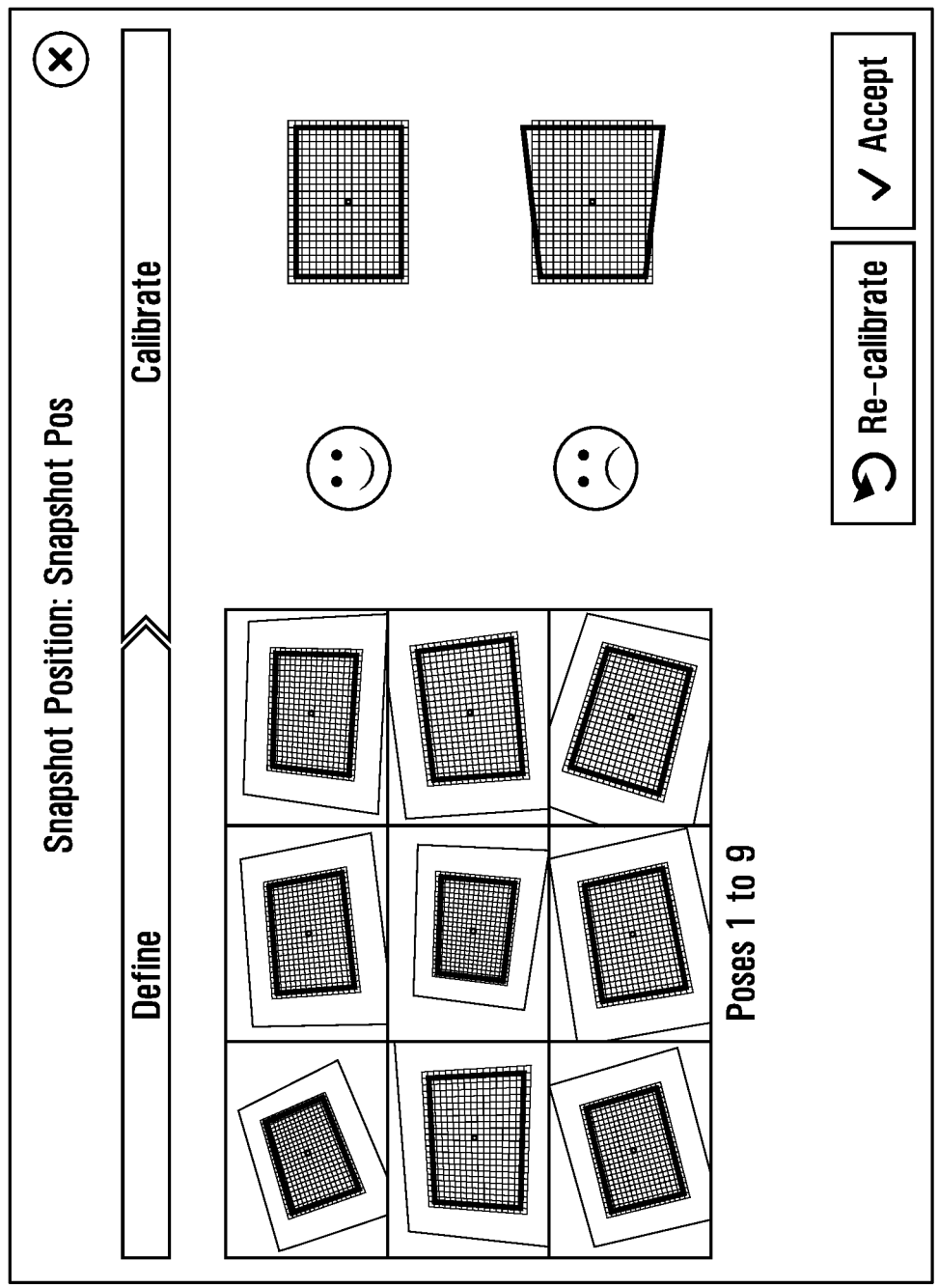
FIG. 5 is a screenshot of the robotic system interface for receiving user confirmation of correctness of recognition of a calibration object at different poses using the robotic arm mounted camera.

In some embodiments, the user can be asked to confirm that the feature recognition in module 53 is functioning accurately, so that the end user is confident that the calibration is reliable. As illustrated in FIG. 5, the user interface 28 may present to the user a series of images taken with camera 30 with certain features marked up therein. In FIG. 5, the calibration image is a checkerboard grid and the features highlighted form a rectangular border of the grid. The various images represent the calibration object viewed from different poses. For each of the images, the user is prompted to select approval or disapproval of the border (or other noticeable feature) recognition. If any one of the images are not correctly recognized, the marked-up border (or other noticeable feature) will not match the features in the image, and the camera calibration process can be continued (re-calibration) with a greater number of poses with a view to improve the calibration until it is able to successfully recognize the calibration object as approved by the user.

Now that the calibration data is stored in 59, the robot 15 is able to position the camera 50 at known poses with respect to the working area 21. Using the same or a different calibration object, the robot system is now able to calibrate the illumination system 55. In this embodiment, illustrated schematically in FIG. 6, the robot system 15 is configured to include an illumination calibration module 61 that controls the robot to change its pose while changing the illumination system 55 intensity so as to calibrate the illumination system. This calibration will then allow image correction based on the illumination system characteristics and the camera pose as per the runtime system illustrated schematically in FIG. 7. The calibration can be performed while ambient illumination is present since the light sources 55 can be controlled, for example turned on and off, so that their contribution to the image brightness is detected.

It will also be appreciated that the acquisition of images of the calibration object, such as the checkerboard grid shown as an example in FIG. 5, can be used to determine a dewarping function for the camera optics, including any image variability due to any focussing mechanism. Once this camera calibration data is determined, it can be stored in store 59 as well. Using such a correction for the camera image allows a smaller and/or lower cost camera to be used to perform reliable object recognition.

Figure 6:
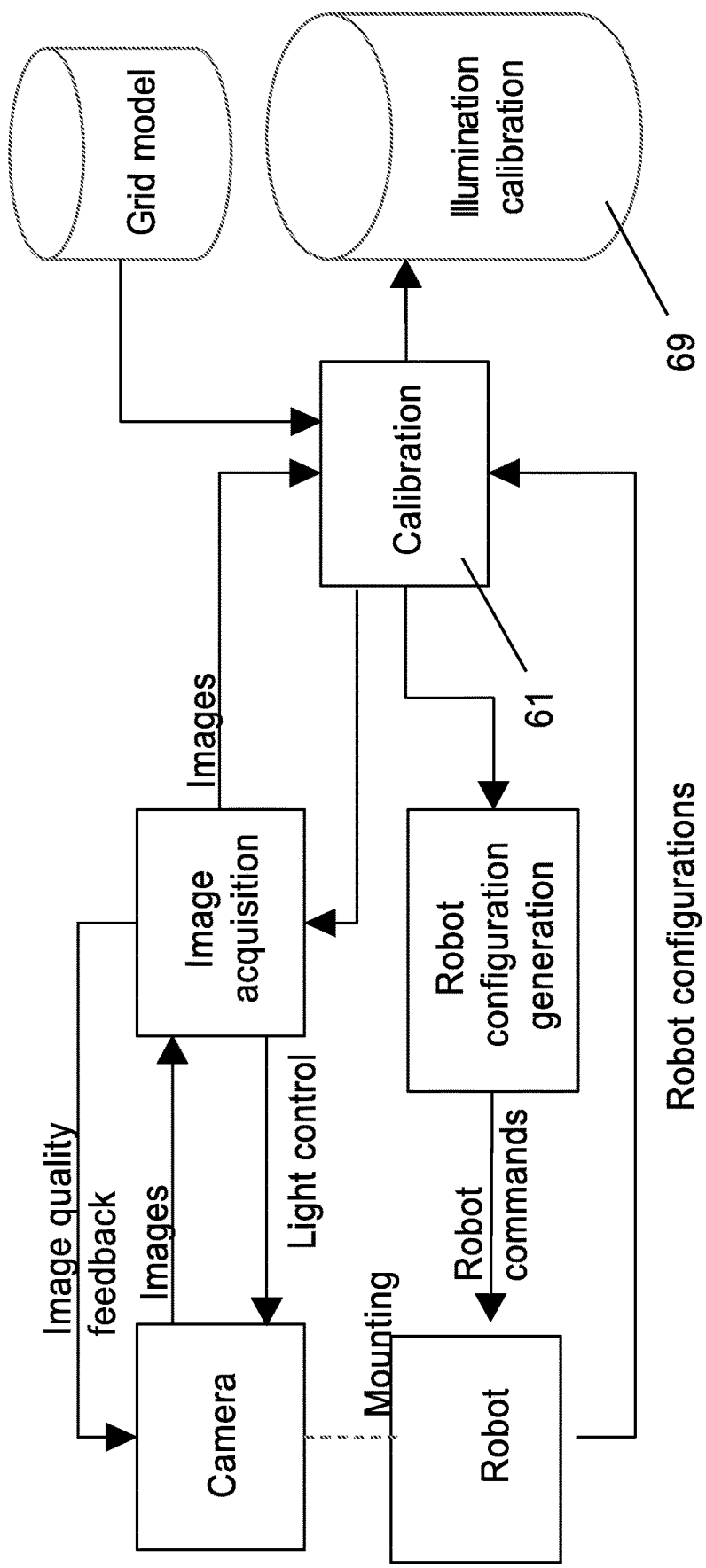
FIG. 6 is a schematic block diagram of a calibration system for the illumination of the camera mounted to the robotic arm.

Module 61 in FIG. 6 can make use of known nonlinear optimization methods (for example Levenberg-Marquardt or Newton-Raphson) to optimize the parameters of a theoretical model (pinhole camera+distortion+calibration grid+camera offset relative to robot flange) to explain the observations of the camera (Grid points detected in the images). Module 61 signals the Robot configuration generation module to move to a new pose while signaling the Image acquisition module to acquire new images to be analyzed using the optimization methods in order to arrive at the illumination calibration dataset stored in store 69. From the convergence position obtained in the automatic centering step, the new pose is sought to optimally cover a volume of viewpoints (for example: a cone of revolution) defined around this position. The robot poses are selected to satisfy a set of criteria that maximize the achievement of useful calibration results. An exemplary technique is to generate random pattern sets and filter them with a neural network to retain only the best sets. See for example the article by R. Y. Tsai, titled *An Efficient and Accurate Camera Calibration Technique for 3D Machine Vision* as published in Proceedings of IEEE Conference on Computer Vision and Pattern Recognition, Miami Beach, Fla., pp. 364-374, 1986.

The illumination system 55 can be an illumination system that uses an inexpensive LED light source and can be an illumination system that has a spatially non-uniform illumination. While two light sources 55L and 55R are used in the embodiment shown, it would be possible to have a single or more than two light sources as desired. Each light source 55 can include an optical diffusion element that broadens their beams. The beam diffusion element can be static or dynamic. Such a dynamic beam diffusion element can be a liquid crystal device as is known in art. Dynamic variation of the beam diffusion pattern can also be useful for providing the best illumination for the focal distance where the object to be recognized is found. In the embodiment illustrated in FIG. 2, the beam diffusion elements are fixed. The image sensor optics 53 can likewise include a tunable lens that can help in acquiring sharper focus images. Such a tunable lens can be a liquid lens or a liquid crystal lens, as is known in the art. In the embodiment illustrated in FIG. 2, a tunable liquid lens is included.

In this way, the camera 30 that the user attached to the robot system 15 with unknown illumination characteristics is automatically calibrated with the end user's assistance to place the known object (e.g. grid) in the working area 21 and to start the automated illumination calibration process using interface 28.

Figure 7:
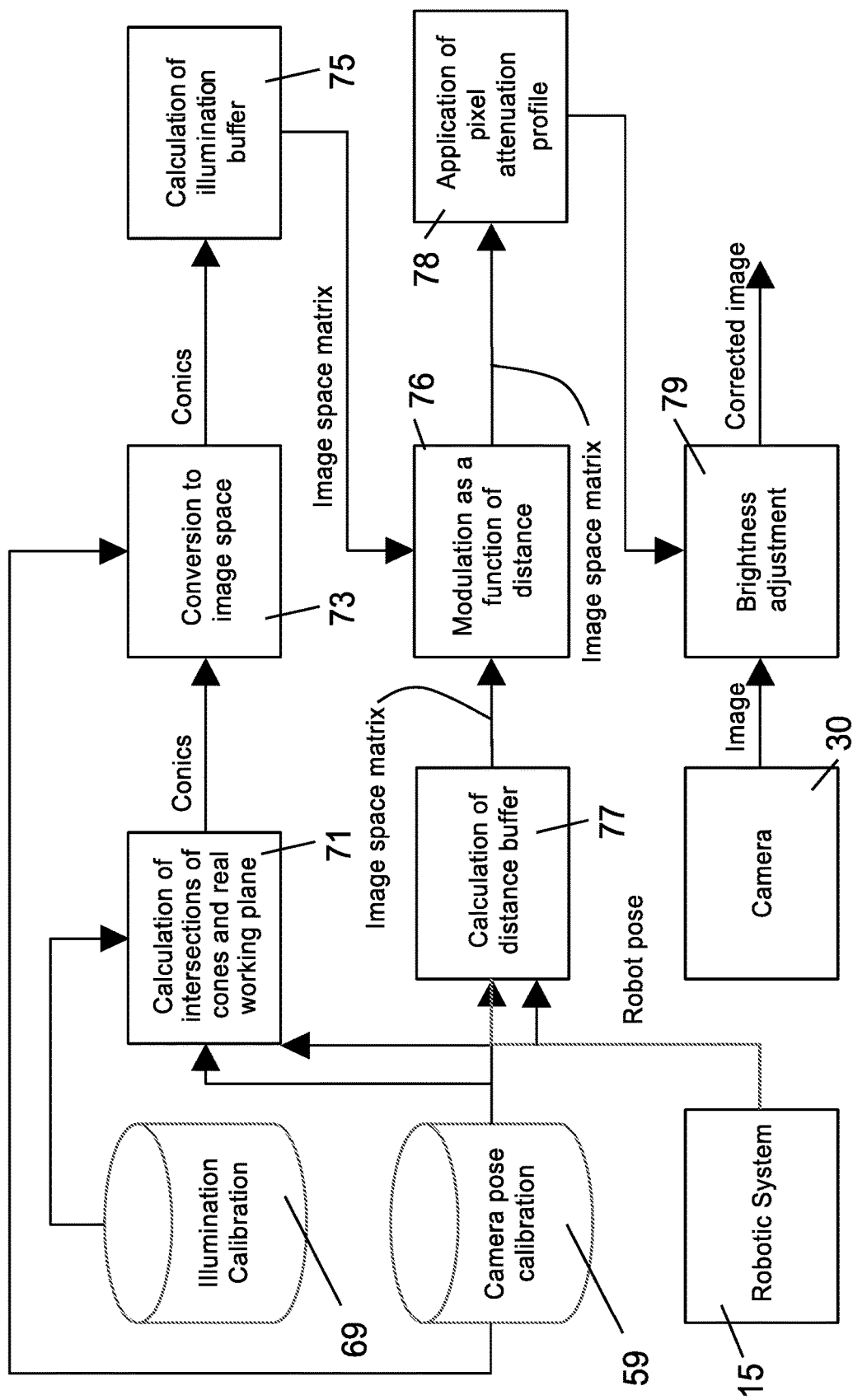
FIG. 7 is a schematic block diagram of the illumination compensation system for adjusting image brightness using the calibration of FIG. 6.

FIG. 7 schematically shows the image pixel brightness correction system. This system allows for the camera image to be corrected to provide an image that is equivalent to an image acquired under conditions of good uniform illumination provided by fixed position light sources. Using the pose calibration 59 to give the camera pose from the robot pose and the illumination calibration 69 to give a volumetric map of illumination, the image brightness correction system shown in FIG. 7 provides corrected brightness camera images.

As an example of illumination compensation, the following image enhancement method that compensates for the non-uniformity of the illumination produced by a lighting system integral with a camera mounted on an industrial robot will be described. Using the knowledge of the lighting system, the camera and the camera working plane or area, the image can be enhanced to provide more uniform machine vision performance within the field of view. The camera system mounted on the wrist of an industrial robot is preferably compact to preserve all the freedom of movement of the robot and thus preserve the simplicity of programming and original control of the robot. Also, to provide a simple system to the user as well as stable performance under changing lighting conditions, a lighting device is preferably included in the system. As a result of the restrictions imposed by the compactness requirements, the illumination device cannot be ideal and cannot illuminate the working area (field of view) uniformly.

It is proposed to correct the non-uniformity of the illumination of the work area by using all available knowledge about lighting and vision systems, the fact that they move together and the information made available by the calibration procedure.

First, the profile of the light intensity can be represented according to a projector model commonly used in image synthesis in which the light beam from a projector is described as consisting of two cones: the "hot spot" and the "fall off". The first is the cone for which the intensity is maximum whereas the second is the one where a transition proceeds smoothly towards a zero level. The parameters (the angles of the cone apertures or solid angles) are expressed as a function of the field of view of the camera and determined experimentally.

In image synthesis, the model is used to simulate the real illumination of the scene, whereas in this case it is used to predict the illumination profile in the work space in order to compensate for areas that are not well illuminated or not illuminated at all by the projector. The double cone model, the information from the calibration of the camera with the robot and the workspace as well as information from the robot are used to calculate the intersection between the cones and the working surface. This is done in module 71. This produces conics (equations of the form: $Ax^2+Bxy+Cy^2+Dx+Ey+F=0$, where A, B and C are non-zero) in the world coordinate system (in physical units). These conics are then projected (module 73) into the image domain using calibration information and they will be used to construct an illumination buffer (module 75). In parallel, a distance buffer (module 77) is calculated from the robot state (from system 15) and the calibration information (from stores 59 and 69). The distance buffer is then used to modulate the illumination buffer (module 76). Then, the attenuation profile is applied to the modulated buffer (module 78). The resulting image is finally used to correct those from the camera 30 in module 79.

With reference to FIGS. 8 to 11, the object learning capabilities that allow an end-user to teach the robotic system to recognize a new object using camera 30 will be described. FIG. 12 illustrates the object recognition system using the object model calibration resulting from the capabilities of FIGS. 8 to 11.

Figure 8:
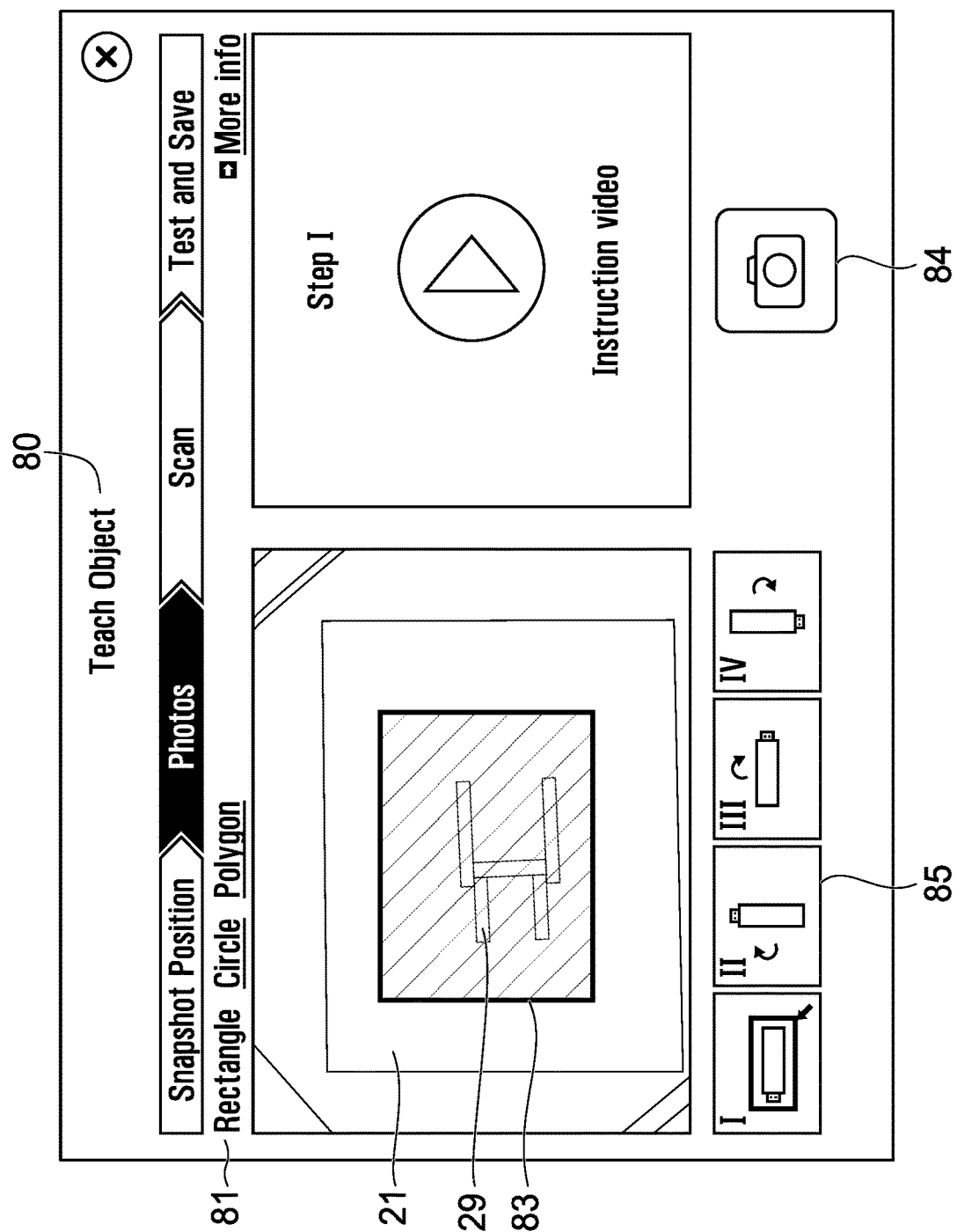
FIG. 8 is a screenshot of an object teach interface allowing the user to select the object and present it in different orientations.

FIG. 8 is a screenshot of a user interface 80 that guides an end-user to teach the robotic system to recognize an object 29. As a first step, the user may select the general shape of the object 29 using a selector 81 (the interface may use a mouse, touchscreen, voice command or any other suitable selection mechanism). While it is possible to omit this boxing function, it improves the accuracy of the object learning process. The calibrated camera 30 can be controlled to view the workspace 21 perpendicularly, although other camera poses could be used. The user then places the object 29 in the workspace 21 in a first orientation. In the example given, there are four such orientations to be identified as orientations I to IV (Roman numerals 1 to 4), and it will be understood that a different number of orientations could be used. The object containment box 83 can then be positioned and sized by the user. When the box 83 and the orientation are confirmed, the user can select the image function 84. The repositioning of the object 29 may be done by the user. These image captures are repeated for the other orientations.

The images taken from the one selected camera pose (for all of the object orientations) are then analyzed to determine the object features that are best recognized in all of the images. The variations in the images are due essentially to variations in lighting. With the spatial variation of the light source 55 being compensated, most of the image variation has to do with ambient lighting variability and the object's response to lighting variations. Any feature whose detectability is highly variable among the images is either discarded or given a low weight. Features whose detectability is highly consistent among the images is given a high weight.

Figure 9:
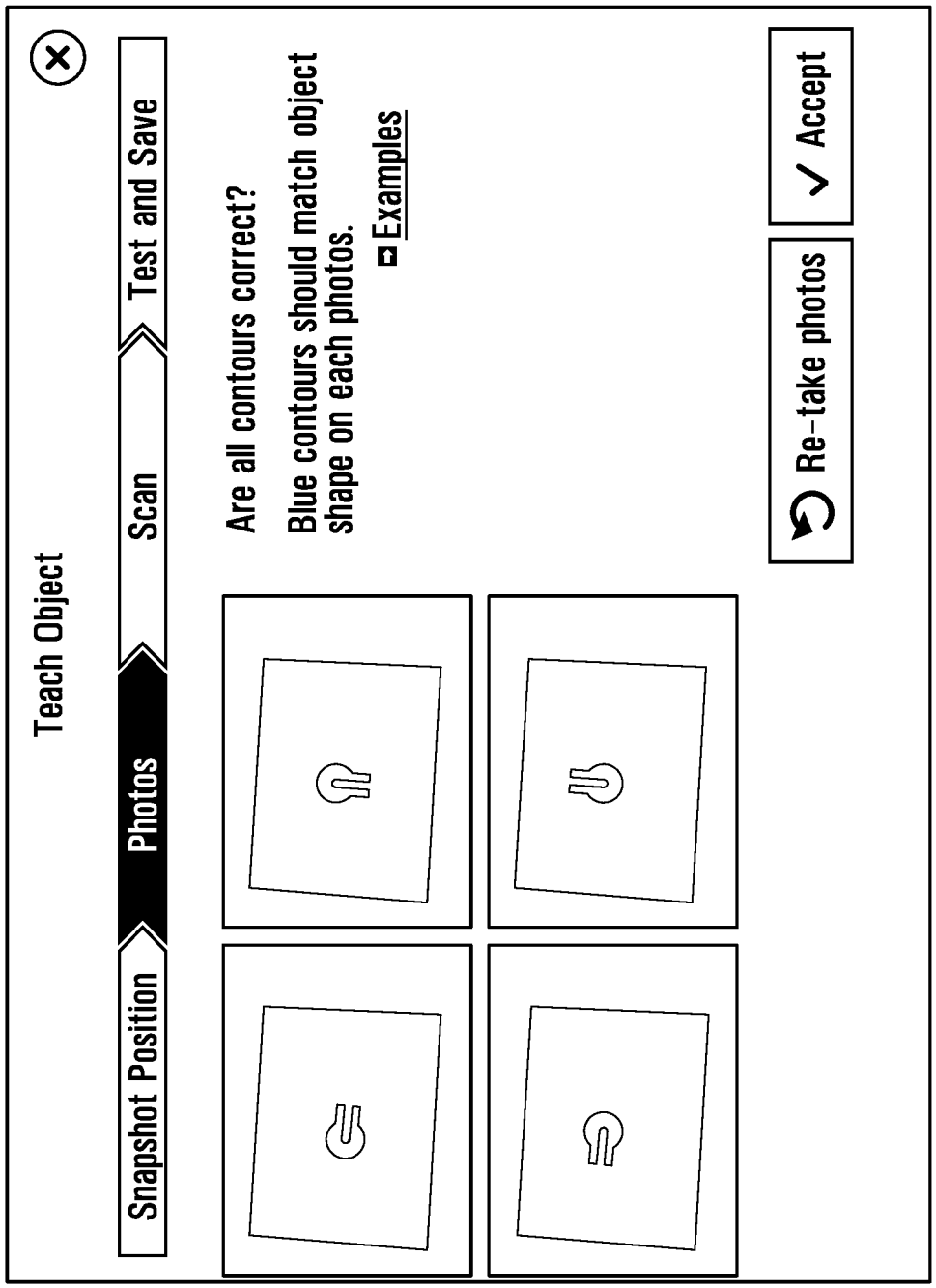
FIG. 9 is a screenshot of an object teach interface allowing the user to confirm that the recognized object contour is accurate in each orientation.

To confirm that the object recognition is sound, the user interface can ask the user to confirm that the recognized object contour is accurate for the various images used. This is shown in FIG. 9. The recognized object contour can be superposed over the object image, for example using a blue line. If the user sees any error in contour recognition, she can select a re-take photos option. If the user sees no error, the contours can be accepted.

The system now needs to improve its weighting of the features of the object using a variety camera poses. The object 29 can remain in one given pose in the workspace 21 during this process.

Figure 10:
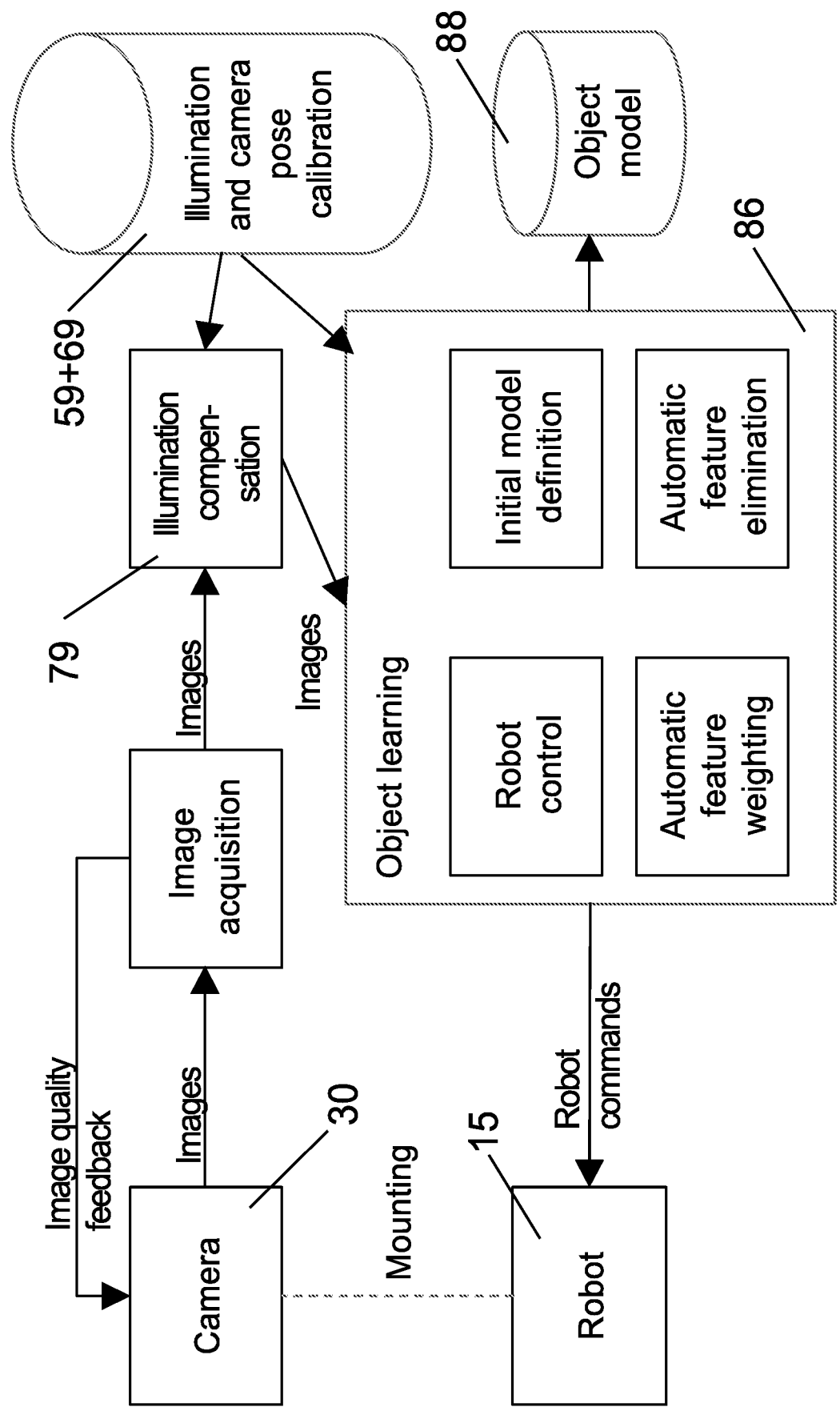
FIG. 10 is a schematic block diagram of an object learning system for the robotic arm system.

As illustrated in FIG. 10, the object learning system includes a module 86 that includes a submodule for robot control to move the camera through a range of poses while an automatic feature weighting module recognizes features in each image and determines what weight should be given to each feature of the object 29 based on the features detectability over the range of images. An initial model definition data store comprises the list of features found in the pre-calibration of FIG. 9. For simplicity in the resulting object model 88, an automatic feature elimination submodule can be included in module 86 to eliminate features having weightings below a given threshold so that such features are not involved in future object recognition.

The system can be configured to acquire repeatedly acquire images under conditions of different exposure times, focus and/or illumination brightness or beam shape, while each different image is subjected to any desired illumination and/or dewarping compensation or correction so that feature extraction and object recognition can be performed using the best image for the camera pose and/or the ambient lighting conditions. This is schematically shown in FIGS. 4A and 10 and being an "image quality feedback" between the image acquisition module and the camera. Image acquisition parameter control can be done within a camera module itself, or within the larger system. The object recognition detection score can even be used to trigger re-acquisition of camera images under different conditions of image acquisition parameters such as exposure time and focus, and of lighting. This can be important to improve the robustness of the machine vision system under the conditions that ambient lighting is variable and/or less than well suited for machine vision.

Figure 11:
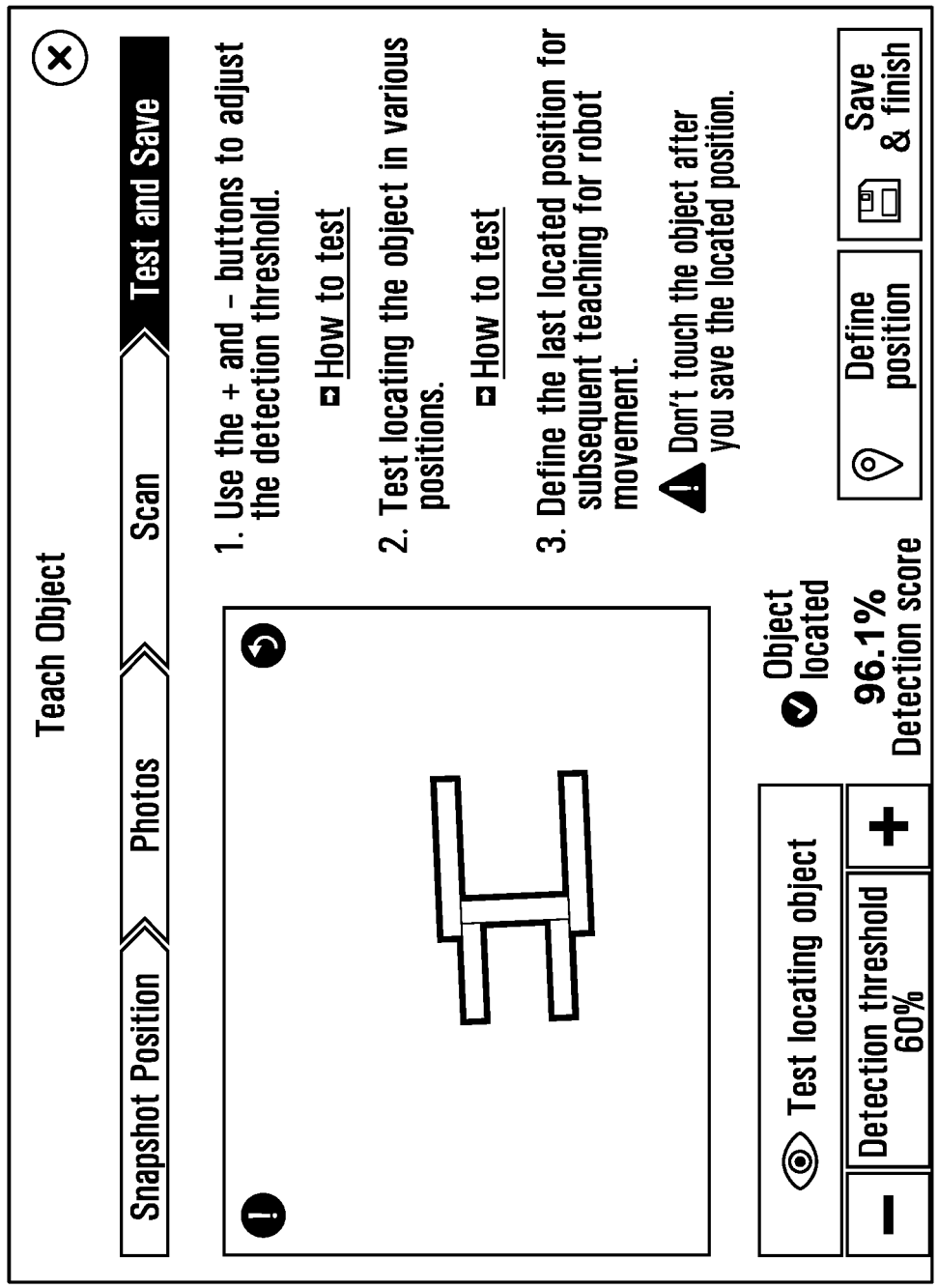
FIG. 11 is a screenshot of an object model detection threshold selector interface.
Figure 12:
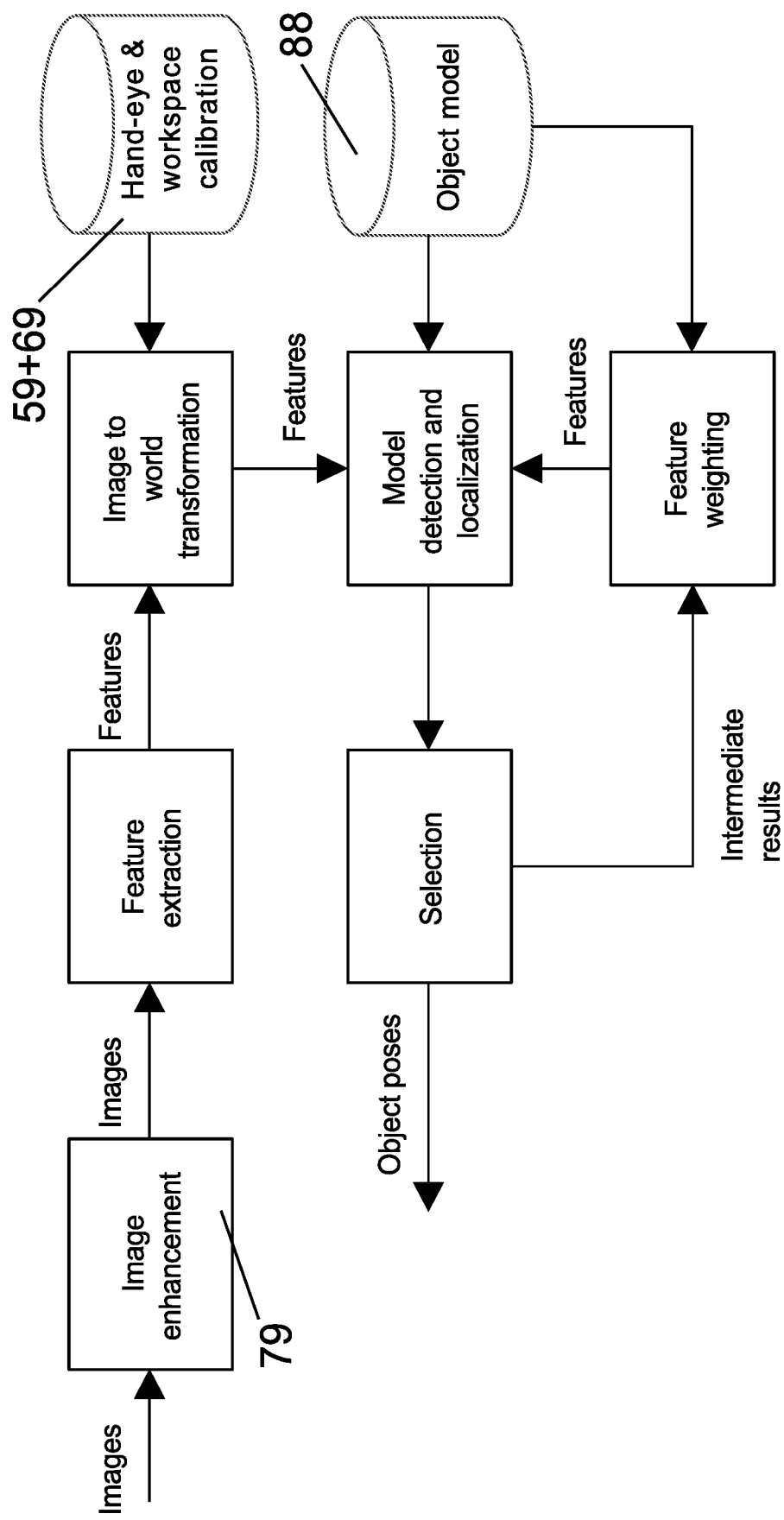
FIG. 12 is a schematic block diagram of the object recognition system that uses the camera, illumination and object model calibrations.

The resulting object model 88 can be validated by user through an interface as exemplified in FIG. 11. In this interface, the user can select a global object detection threshold using the interface 91. When the features of the object 29 using their established weightings from model 88 and the detection threshold allow the object to be recognized, the use can move the object 29 and/or the pose of the camera 30 to confirm that the selected threshold will also be sufficient to detect the object 29. The threshold for all poses that best discriminates the object from background objects is the most suitable as it promises not to fail in detecting the object 29, while promising not to make any false detections of background objects.

What is claimed is:

1. A method of producing a product using a robotic system configured to perform at least one task on at least one object within a workspace that is subject to non-uniform ambient lighting, the method comprising:
    attaching to a robotic arm a camera, said robotic arm having an end-effector for performing said at least one task on said at least one object;
    performing an automated object model calibration under conditions of variable robotic arm pose dependent feature recognition of said at least one object;
    teaching said robotic system to perform said at least one task on said at least one object by a user using an end-user interface; and
    using said robotic system to follow said teaching to perform said at least one task on said at least one object using said camera to recognize a pose of said at least one object within said workspace with said object model calibration.

2. The method as defined in claim 1, further comprising:
    placing a known reference object within said workspace; and
    performing an automated camera pose transformation and plane of said workspace determination including repeated recognition of said reference object and movements of said robotic arm to change a distance and orientation between said camera and said reference object.

3. The method as defined in claim 2, further comprising:
    presenting to said user on said end-user interface a machine vision recognition of said reference object for a plurality of camera poses; and
    receiving user confirmation that said machine vision recognition of said reference object is accurate or whether said automated camera pose transformation determination needs improvement.

4. The method as defined in claim 1, further comprising:
    placing one of: said known reference object; and an other known reference object within said workspace; and
    determining a dewarping function correcting for optical distortions of said camera.

5. The method as defined in claim 2, wherein one of: said known reference object and said other known reference object is a test grid sheet.

6. The method as defined in claim 1, further comprising:
    performing an automated camera illumination calibration of robotic arm pose dependent image brightness;
    performing robotic arm pose dependent image brightness compensation on images acquired using said camera and said camera illumination calibration;
    wherein said using said robotic system to follow said teaching to perform said at least one task on said at least one object comprises using said images following said brightness compensation.

7. The method as defined in claim 1, wherein said performing said automated object model calibration comprises:
    said user placing one of said at least one object within said workspace in a plurality of orientations for a same camera pose to form an initial model;
    recognizing features of said one of said at least one object from a variety of camera poses to build a refined model in which weights accorded to features in said refined model depend on an ability to recognize said features in said variety of camera poses.

8. The method as defined in claim 7, wherein said performing said automated object model calibration further comprises:
    displaying to said user a recognition of features from said plurality of orientations and receiving user input to validate said recognition of features.

9. The method as defined in claim 1, wherein said performing said automated object model calibration further comprises:
    accepting user input to define a detection threshold for detecting said one of said at least one objects using said refined model;
    displaying to said user one of: said recognition of features; and an other recognition of features from said refined model using said detection threshold for a given camera pose, wherein said user can validate that said user selected detection threshold is satisfactory for a desired variety of camera poses.

10. The method as defined in claim 9, wherein said performing said automated object model calibration comprises removing from said refined model features that cannot reliably be used under conditions of various camera poses.

11. The method as defined in claim 1, further comprising attaching a light source to said robotic arm.

12. The method as defined in claim 11, said using said robotic system to follow said teaching to perform said at least one task on said at least one object using said camera to recognize said pose of said at least one object within said workspace with said object model calibration comprises:
    adjusting illumination parameters of said light source while repeatedly acquiring one of: said images; and other images using said camera so as to recognize said pose more reliably and/or accurately.

13. The method as defined in claim 1, said using said robotic system to follow said teaching to perform said at least one task on said at least one object using said camera to recognize a pose of said at least one object within said workspace with said object model calibration comprises:
    adjusting image acquisition parameters of said camera while repeatedly acquiring one of: said images; and said other images using said camera so as to recognize said pose more reliably and/or accurately.

14. A robotic arm mounted camera comprising:
    a main body having parallel top and bottom sides and adapted to be fastened to a robotic arm end and to an end effector;
    an image sensor and imaging optics arranged in said main body in a portion extending sideways; and
    an illumination source arranged in said main body in said portion extending sideways for lighting a field of view of said image sensor and imaging optics.

15. The camera as defined in claim 14, further comprising a data interface contained in said housing for connecting said camera to a robotic arm control system.

16. The camera as defined in claim 14, further comprising a data connector for connecting to said end effector, said data interface providing connectivity for said end effector to said robotic arm control system.

17. The camera as defined in claim 15, further comprising a cable connector on a side of said main body for receiving power and data from said robotic arm control system.

\* \* \* \* \*